United States Patent
Silverbrook

(10) Patent No.: US 7,032,998 B2
(45) Date of Patent: Apr. 25, 2006

(54) INK JET PRINTHEAD CHIP THAT INCORPORATES THROUGH-WAFER INK EJECTION MECHANISMS

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 11/001,348

(22) Filed: Dec. 2, 2004

(65) Prior Publication Data

US 2005/0087512 A1    Apr. 28, 2005

Related U.S. Application Data

(63) Continuation of application No. 10/307,336, filed on Dec. 2, 2002, now Pat. No. 6,945,630, which is a continuation of application No. 09/900,159, filed on Jul. 9, 2001, now Pat. No. 6,488,359, which is a continuation-in-part of application No. 09/112,778, filed on Jul. 10, 1998, now Pat. No. 6,416,168.

(30) Foreign Application Priority Data

Jul. 15, 1997 (AU) ..................................... PO7991
Jul. 15, 1997 (AU) ..................................... PO8057

(51) Int. Cl.
*B41J 2/04* (2006.01)
*B41J 2/05* (2006.01)

(52) U.S. Cl. .......................................... 347/54; 347/65
(58) Field of Classification Search ................. 347/54, 347/56, 65
See application file for complete search history.

(56) References Cited

U.S. PATENT DOCUMENTS

| | | |
|---|---|---|
| 4,423,401 A | 12/1983 | Mueller |
| 4,553,393 A | 11/1985 | Ruoff |
| 4,672,398 A | 6/1987 | Kuwabara et al. |
| 4,737,802 A | 4/1988 | Mielke |

(Continued)

FOREIGN PATENT DOCUMENTS

DE    1 648 322    3/1971

(Continued)

OTHER PUBLICATIONS

Noworolski, J. Mark et al, "Process for in-plane and out-of-plane single-crystal-silicon thermal microactuators". Sensors and Actuators, A, CH, Elsevier Sequoia S.A., Lausanne, vol. 55, No. 1, Jul. 15, 1996, pp 65-69, XP004077979 ISSN: 0924-4247.

(Continued)

*Primary Examiner*—An H. Do

(57) ABSTRACT

An inkjet printhead chip includes a wafer substrate. A drive circuitry layer is positioned on one side of the wafer substrate. The wafer substrate and the drive circuitry layer define a plurality of ink ejection channels that extend between both sides of the wafer substrate. A plurality of nozzle chamber structures is positioned on said one side of the wafer substrate. Each nozzle chamber structure defines a nozzle chamber in fluid communication with a respective ink ejection channel and includes a roof wall positioned on a respective channel opening and defining an ink ejection port in fluid communication with the channel. A wall assembly bounds each channel opening so that the nozzle chamber is defined by the wall assembly and the roof wall. A plurality of ink ejection mechanisms is operatively engaged with respective nozzle chamber structures and is operable to eject ink from the respective nozzle chambers. A plurality of micro-electromechanical actuators is connected to the drive circuitry layer. Each actuator is connected to a respective ink ejection mechanism to act on the ink ejection mechanism on receipt of an electrical signal from the drive circuitry layer.

7 Claims, 7 Drawing Sheets

U.S. PATENT DOCUMENTS

| | | | |
|---|---|---|---|
| 4,864,824 | A | 9/1989 | Gabriel et al. |
| 5,029,805 | A | 7/1991 | Albarda et al. |
| 5,258,774 | A | 11/1993 | Rogers |
| 5,666,141 | A | 9/1997 | Matoba et al. |
| 5,719,604 | A | 2/1998 | Inui et al. |
| 5,812,159 | A | 9/1998 | Anagnostopoulos et al. |
| 5,828,394 | A | 10/1998 | Khuri-Yakub |
| 5,838,351 | A | 11/1998 | Weber |
| 5,877,580 | A | 3/1999 | Swierkowski |
| 6,041,600 | A | 3/2000 | Silverbrook |
| 6,174,050 | B1 | 1/2001 | Kashino et al. |
| 6,488,359 | B1 | 12/2002 | Silverbrook |

FOREIGN PATENT DOCUMENTS

| | | |
|---|---|---|
| DE | 29 05 063 | 8/1980 |
| DE | 32 45 283 | 6/1984 |
| DE | 34 30 155 | 2/1986 |
| DE | 37 16 996 | 12/1988 |
| DE | 39 34 280 | 4/1990 |
| DE | 43 28 433 | 3/1995 |
| DE | 195 16 997 | 11/1995 |
| DE | 195 17 969 | 11/1995 |
| DE | 195 32 913 | 3/1996 |
| DE | 196 23 620 | 12/1996 |
| DE | 196 39 717 | 4/1997 |
| EP | 0 092 229 | 10/1983 |
| EP | 0 398 031 | 11/1990 |
| EP | 0416540 | 3/1991 |
| EP | 0 427 291 | 5/1991 |
| EP | 0 431 338 | 6/1991 |
| EP | 0 478 956 | 4/1992 |
| EP | 0 506 232 | 9/1992 |
| EP | 0 510 648 | 10/1992 |
| EP | 0 627 314 | 12/1994 |
| EP | 0 634 273 | 1/1995 |
| EP | 0 713 774 | 5/1996 |
| EP | 0 737 580 | 10/1996 |
| EP | 0 750 993 | 1/1997 |
| EP | 0 882 590 | 12/1998 |
| FR | 2 231 076 | 12/1974 |
| GB | 792 145 | 3/1958 |
| GB | 1 428 239 | 3/1976 |
| GB | 2 262 152 | 6/1993 |
| JP | 58 112747 | 7/1983 |
| JP | 58 116165 | 7/1983 |
| JP | 61 025849 | 2/1986 |
| JP | 61 268453 | 11/1986 |
| JP | 01 105746 | 4/1989 |
| JP | 01 115639 | 5/1989 |
| JP | 01 128839 | 5/1989 |
| JP | 01 257058 | 10/1989 |
| JP | 01 306254 | 12/1989 |
| JP | 402030543 | 1/1990 |
| JP | 02 050841 | 2/1990 |
| JP | 2-92643 | 4/1990 |
| JP | 2-108544 | 4/1990 |
| JP | 02 158348 | 6/1990 |
| JP | 02 162049 | 6/1990 |
| JP | 2-265752 | 10/1990 |
| JP | 03 653348 | 3/1991 |
| JP | 03 112662 | 5/1991 |
| JP | 03 180350 | 8/1991 |
| JP | 04 118241 | 4/1992 |
| JP | 04 126255 | 4/1992 |
| JP | 04 141429 | 5/1992 |
| JP | 4-353458 | 12/1992 |
| JP | 04 368851 | 12/1992 |
| JP | 05 28765 | 10/1993 |
| JP | 05 318724 | 12/1993 |
| JP | 6-91865 | 4/1994 |
| JP | 6-91866 | 4/1994 |
| JP | 07 314665 | 12/1995 |
| JP | 10-143434 | 5/1998 |
| JP | 11345286 | 12/1999 |
| JP | 2000163547 | 6/2000 |
| WO | WO 94 18010 | 8/1994 |
| WO | WO 97 12689 | 4/1997 |

OTHER PUBLICATIONS

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp 146-150, XP000443412, ISSN: 1057-7157.

Yamagata, Yutaka et al, "A Micro Mobile Mechanism Using Thermal Expansion and its Theoretical Analysis". Proceedeing of the workshop on micro electro mechanical systems (MEMS), US, New York, IEEE, vol. Workshop 7, Jan. 25, 1994, pp 142-147, XP000528408, ISBN: 0-7803-1834-X.

INK JET PRINTHEAD CHIP THAT INCORPORATES THROUGH-WAFER INK EJECTION MECHANISMS

CROSS-REFERENCE TO RELATED APPLICATIONS

This is a Continuation of U.S. application Ser. No. 10/307,336 filed on Dec. 2, 2002, now issued as U.S. Pat. No. 6,945,630, which is a Continuation of U.S. application Ser. No. 09/900,159 filed on Jul. 9, 2001, now issued as U.S. Pat. No. 6,488,359 which is a Continuation-in-Part of U.S. application Ser. No. 09/112,778 filed on Jul. 10, 1998, now issued as U.S. Pat. No. 6,416,168 all of which are herein incorporated by reference.

U.S. Pat. Nos. 6,557,977, 6,227,652, 6,213,589, 6,247,795, 6,394,581, 6,244,691, 6,257,704, 6,220,694, 6,234,610, 6,247,793, 6,264,306, 6,241,342, 6,254,220, 6,302,528, 6,239,821, and 6,247,796 are hereby incorporated by reference.

FIELD OF THE INVENTION

This invention relates to ink jet printheads. More particularly, this invention relates to an ink jet printhead that incorporates through-chip ink ejection nozzle arrangements.

BACKGROUND TO THE INVENTION

The Applicant has invented an ink jet printhead that is capable of generating text and images at a resolution of up to 1600 dpi.

In order to achieve this, the Applicant has made extensive use of micro electromechanical systems technology. In particular, the Applicant has developed integrated circuit fabrication techniques suitable for the manufacture of such printheads. The Applicant has filed a large number of patent applications in this field, many of which have now been allowed.

The printheads developed by the Applicant can include up to 84000 nozzle arrangements. Each nozzle arrangement has at least one moving component that serves to eject ink from a nozzle chamber. The components usually either act directly on the ink or act on a closure which serves to permit or inhibit the ejection of ink from the nozzle chamber.

The moving components within the printheads are microscopically dimensioned. This is necessary, given the large number of nozzle arrangements per printhead. The Applicant has spent a substantial amount of time and effort developing configurations for such printheads.

One of the reasons for this is that, as is known in the field of integrated circuit fabrication, cost of on-chip real estate is extremely high. Furthermore, it is important that levels of complexity are kept to a minimum since these significantly increase the cost of fabrication.

Integrated circuit fabrication techniques involve what is generally a deposition and etching process. As a result, devices which are manufactured in accordance with such techniques are usually, of necessity, in a layered construction. Furthermore, it is important to develop a configuration where a high number of devices can be fabricated per unit area of chip surface.

The present invention has been conceived by the Applicant to address the difficulties associated with achieving the high packing density of the nozzle arrangements and thereby to facilitate substantial cost saving in manufacture.

SUMMARY OF THE INVENTION

According to a first aspect of the invention, there is provided an ink jet printhead chip that is the product of an integrated circuit fabrication technique, the printhead chip comprising a wafer substrate having a front surface and a rear surface, a plurality of ink passages being defined through the wafer substrate, so that each ink passage defines an inlet at a rear surface of the wafer substrate and an outlet at a front surface of the wafer substrate, each ink passage being in fluid communication with an ink supply at the rear surface of the wafer substrate; and a plurality of actuators that are positioned on the rear surface of the wafer substrate and are operatively arranged with respect to the ink passages to generate an ink flow through each passage, from the rear surface to the front surface, when activated.

Preferably the roof walls, side walls and floor walls are positioned on the rear surface of the wafer substrate to define a plurality of nozzle chambers, each roof wall defining an ink ejection port that is in fluid communication with a respective ink channel, an actuator being operatively arranged with respect to each nozzle chamber to eject ink from the nozzle chamber out of the ink ejection port and into the ink channel.

Each actuator may include an ink displacement member that defines at least the floor wall of each nozzle chamber, the ink displacement member being movable towards and away from the roof wall of the nozzle chamber to eject ink from the ink ejection port.

Each actuator may include an actuating device that is positioned on the rear side of the wafer substrate and is connected to the ink displacement member to move the ink displacement member towards and away from the ink ejection port.

There may be a protective enclosure positioned on the rear surface of the wafer substrate, each actuating device being housed in the protective enclosure.

Each actuating device maybe a thermal actuator, having a deformable body of expansion material that has a coefficient of thermal expansion which is such that expansion of the material on the application of heat can be harnessed to perform work, the body being connected to an ink displacement member so that deformation of the body on the application of heat results in movement of the ink displacement member towards the ink ejection port.

The protective enclosure may include a fluidic seal, the ink displacement member being connected to the deformable member through the fluidic seal.

According to a second aspect of the invention, there is provided an ink jet printhead chip that is the product of an integrated circuit fabrication technique, the ink jet printhead chip comprising a wafer substrate;

a plurality of ink passages defined through the wafer substrate, so that each ink passage defmes an inlet at a rear surface of the wafer substrate and an outlet at a front surface of the wafer substrate, each ink passage being in fluid communication with an ink supply at the rear surface of the wafer substrate;

roof walls, side walls and floor walls that are positioned on the rear surface of the wafer substrate to define a plurality of nozzle chambers, each roof wall defining an ink ejection port that is in fluid communication with a respective ink passage; and a plurality of actuators that are positioned on the rear surface of the wafer substrate so that each actuator is operatively arranged with respect to each nozzle chamber to eject ink from the nozzle chamber and out of the ink ejection port.

The invention is now described, by way of examples, with reference to the accompanying drawings. The specific nature of the following description is not to be construed as limiting the scope of the above summary, in any way.

DETAILED DESCRIPTION OF THE DRAWINGS

Figure 1:
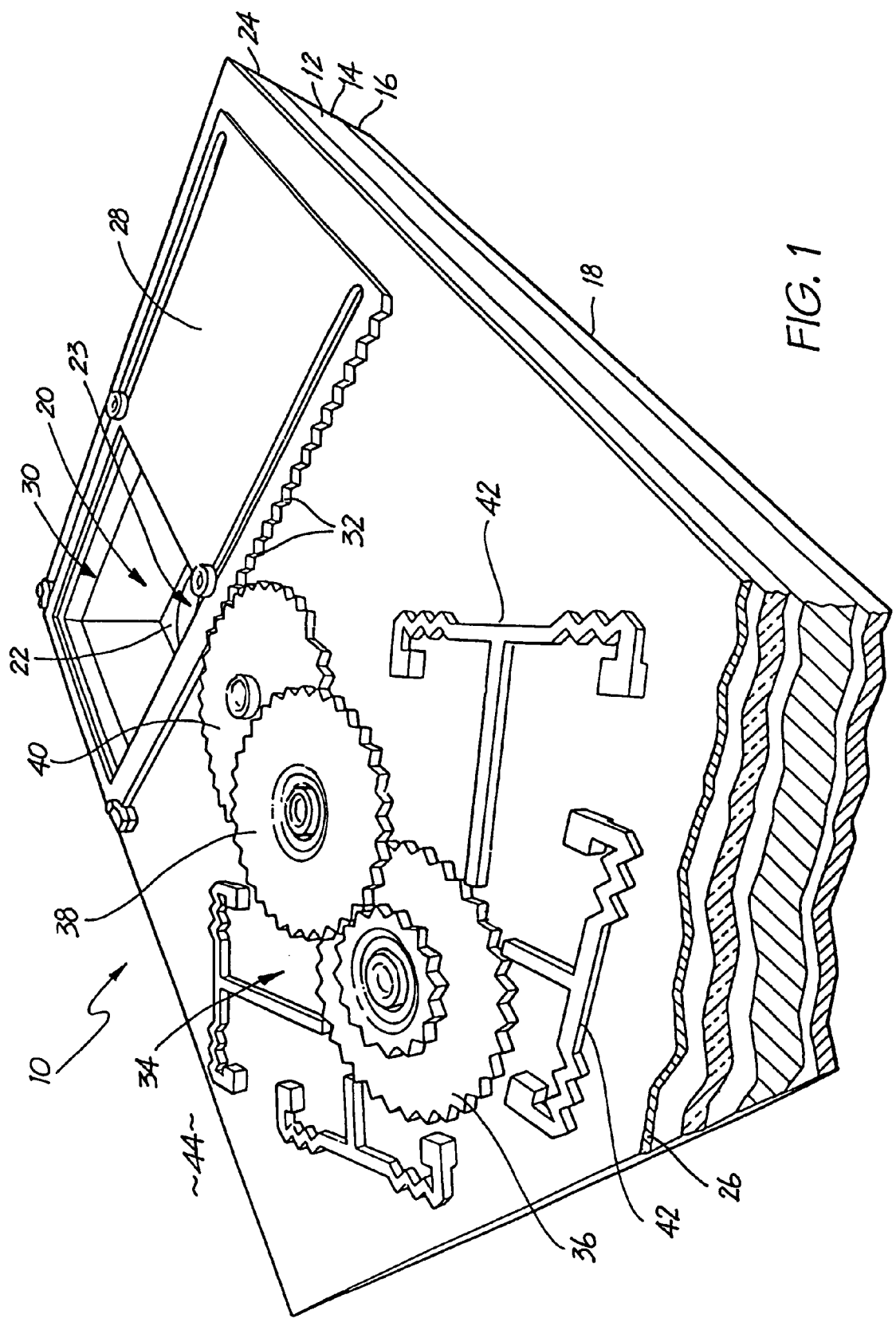
FIG. 1 shows a three dimensional view of a first embodiment of part of a printhead chip, in accordance with the invention.

In the drawings, reference is made to a nozzle arrangement. It will be appreciated that the printhead chip of the invention comprises a plurality of the nozzle arrangements. Furthermore, as set out in the preamble, the printhead chips can incorporate an extremely high number of such nozzle arrangements. Accordingly, only one nozzle arrangement is shown in each of the drawings, for the sake of convenience and for ease of description. It will readily be appreciated that replicating each of the nozzle arrangements to a sufficiently high degree will provide a reader with a configuration of the printhead chip, in accordance with the invention.

Figure 2:
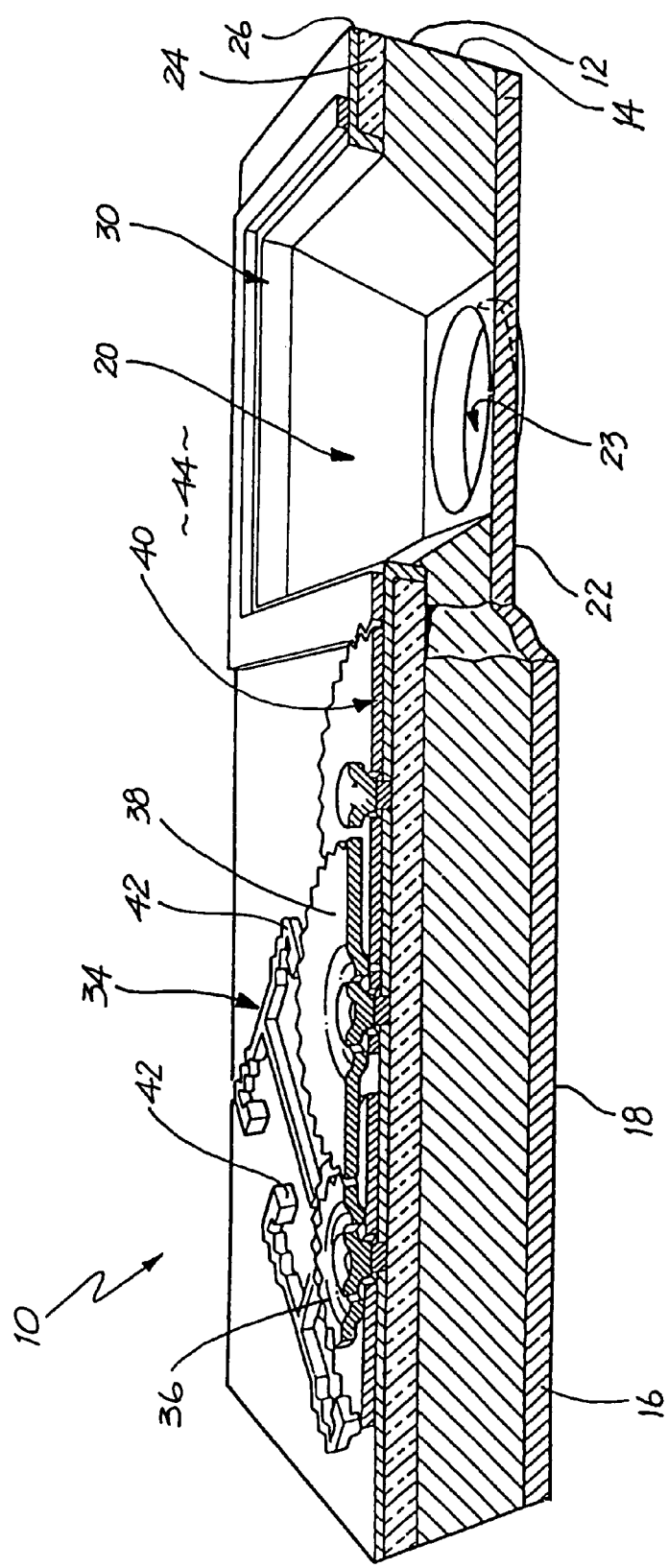
FIG. 2 shows a sectioned side view of the printhead chip of FIG. 1.

In FIGS. 1 and 2, reference numeral 10 generally indicates a nozzle arrangement of a printhead chip, in accordance with the invention.

The nozzle arrangement 10 includes a substrate 12 forming part of the printhead chip of the invention. The substrate 12 includes a wafer substrate 14. An epitaxial layer 16 of boron doped silicon is deposited on a front surface of the wafer substrate 14. The epitaxial layer 16 thus defines an etch stop layer 18. The wafer substrate 14 is etched to define a nozzle chamber 20 so that the etch stop layer 18 defines a roof wall 22 of the nozzle chamber 20.

The roof wall 22 is itself etched to define an ink ejection port 23. It follows that the nozzle chamber 20 and the ink ejection port 23 together define an ink passage through the wafer substrate 14.

A drive circuitry layer 24 is positioned on a rear surface of the wafer substrate 14 and incorporates drive circuitry (not shown) for the nozzle arrangement 10. An ink passivation layer 26 of silicon nitride is deposited on the drive circuitry layer 24.

In this particular embodiment, a shutter member or shutter 28 is positioned on the layer 26 and is displaceable between a closed position in which the shutter 28 covers an inlet 30 of the nozzle chamber 20 and an open position in which ink is permitted to flow into the nozzle chamber 20. The shutter 28 has a toothed edge 32.

The nozzle arrangement 10 includes a micro electromechanical drive mechanism 34 to drive the shutter 28 between its closed and open positions. In particular, the drive mechanism 34 includes a series of gears 36, 38, 40 which engage the toothed edge 32 of the shutter 28. In particular, the gear 36 is driven by actuators 42. The gear 36 is engaged with the gear 38, which, in turn, is engaged with the gear 40. The gears 36, 38, 40 are configured to achieve a reduction effect on the gear 40. The gear 40 is engaged with the toothed edge 32.

The actuators 42 are electrically connected to the drive circuitry layer 24 to be controlled via a suitable control system (not shown) which, in turn, is connected to the drive circuitry layer 24.

The drive mechanism 34, the ink passivation layer 26 and the shutter 28 are all in fluid contact with an ink reservoir 44 (shown in FIGS. 3 to 6).

In this embodiment, the ink within the ink reservoir 44 is repeatedly pressurized to an extent sufficient to facilitate the ejection of ink from the ink ejection port 23. Thus, by controlling operation of the shutter 28 via the drive circuitry layer 24 and the drive mechanism 34, selective ejection of ink from the ink ejection port 23 can be achieved.

It will be appreciated that, in this embodiment, the ink is ejected through the wafer substrate 14 from the rear surface of the wafer substrate 14 towards the front surface of the wafer substrate 14.

Details of the operation of the drive mechanism 34 and of the remainder of the nozzle arrangement 10 are set out in the above referenced US applications. It follows that this detail will not be covered in this specification.

Figure 3:
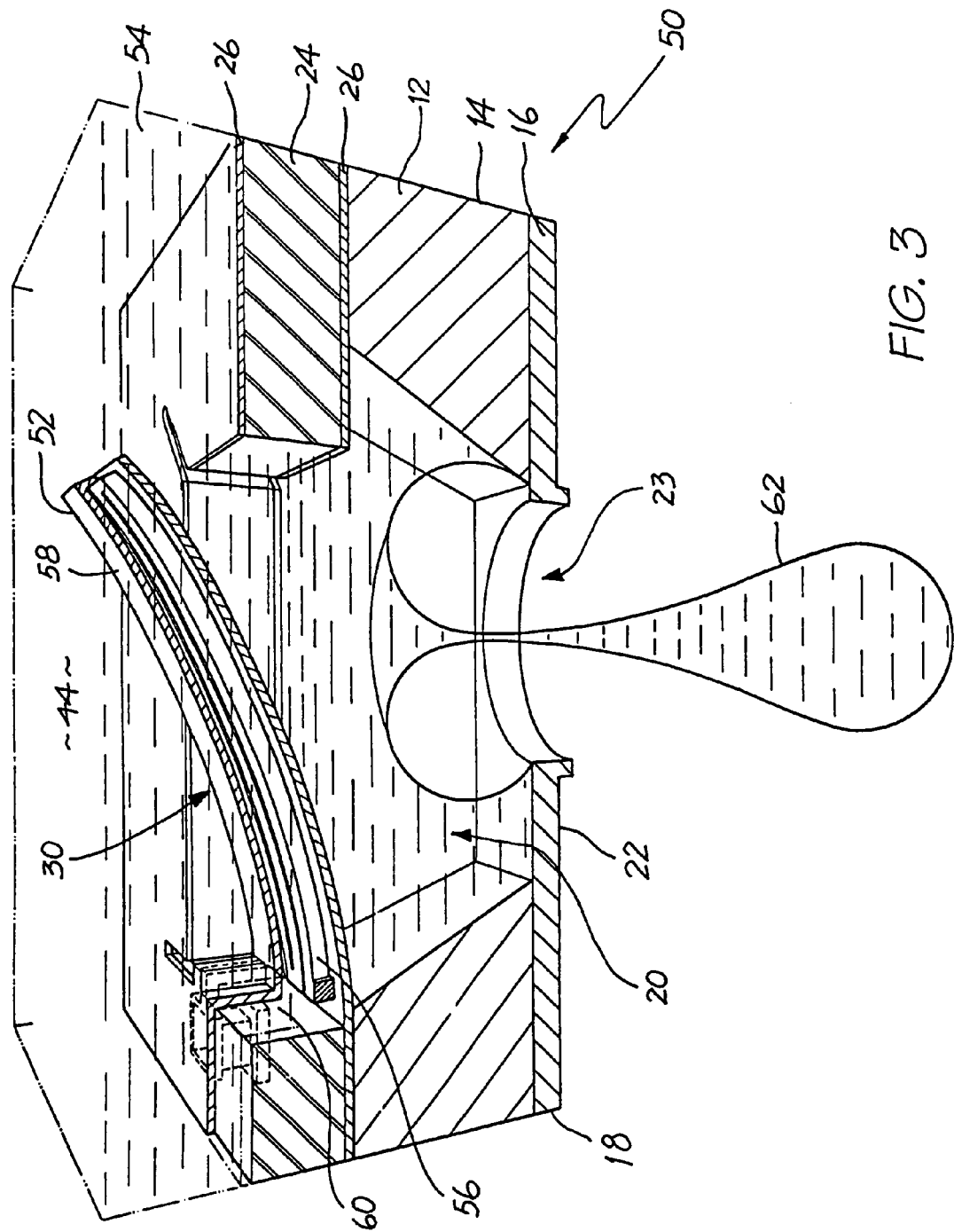
FIG. 3 shows a sectioned side view of a second embodiment of a printhead chip, in accordance with the invention, with a nozzle arrangement of the printhead chip in a pre-operative condition.
Figure 4:
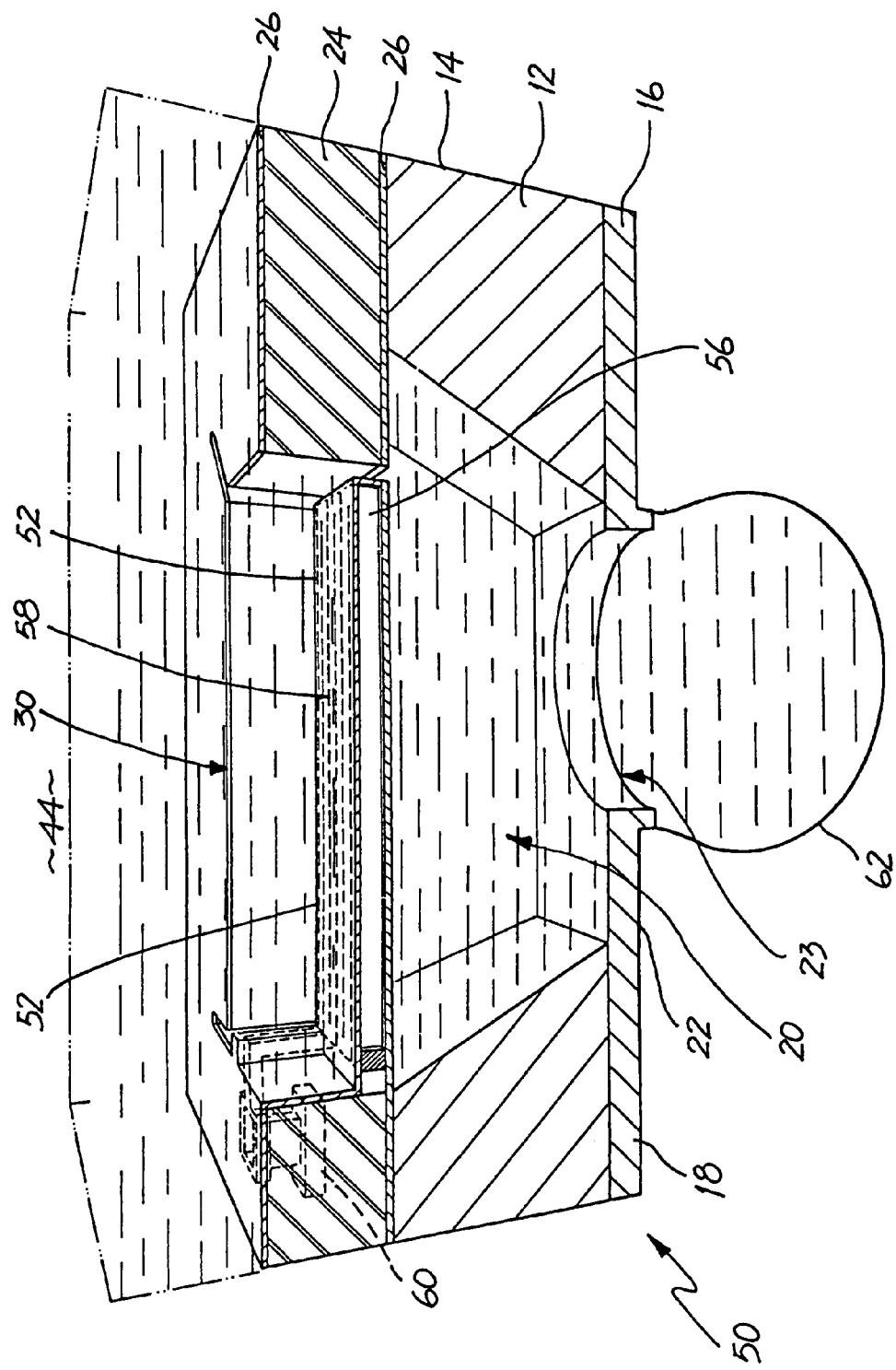
FIG. 4 shows the nozzle arrangement of FIG. 3, in a post-operative condition.

In FIGS. 3 and 4, reference numeral 50 generally indicates a nozzle arrangement of a second embodiment of a printhead chip, in accordance with the invention. With reference to FIGS. 1 and 2, like reference numerals refer to like parts, unless otherwise specified.

Instead of the shutter 28 used in combination with the repeatedly pressurized ink to achieve drop ejection, the nozzle arrangement 50 includes an actuator 52 which acts directly on ink 54 in the nozzle chamber 20.

The actuator 52 includes a heater element 56 which is of a shape memory alloy. In this particular example, the shape memory alloy is a nickel titanium alloy.

Details of the shape memory alloy are provided in the above referenced US applications and are therefore not set out in this specification.

The heater element 56 has a trained shape as shown in FIG. 4. A layer 58 of silicon nitride is deposited, under tension, on the heater element 56, with the heater element 56 in its martensitic phase. This causes the heater element 56, together with the layer 58, to bend away from the ink ejection port 23, as shown in FIG. 3.

The heater element 56 is connected to the drive circuitry layer 24 with suitable vias 60. Furthermore, the heater element 56 is configured to be resistively or joule heated when a current from the drive circuitry layer 24 passes through the heater element 56. This heat is sufficient to raise the temperature of the heater element 56 above its transformation temperature. This results in the heater element 56 undergoing a crystalline change into its austenitic phase, thereby reverting to its trained shape as shown in FIG. 4. The resultant movement results in the generation of a drop 62 of ink.

When the heater element 56 cools, the tension that has built up in the layer 58 results in the heater element 56, now in its martensitic phase, returning to the position shown in FIG. 3. This facilitates necking and separation of the drop 62.

Figure 5:
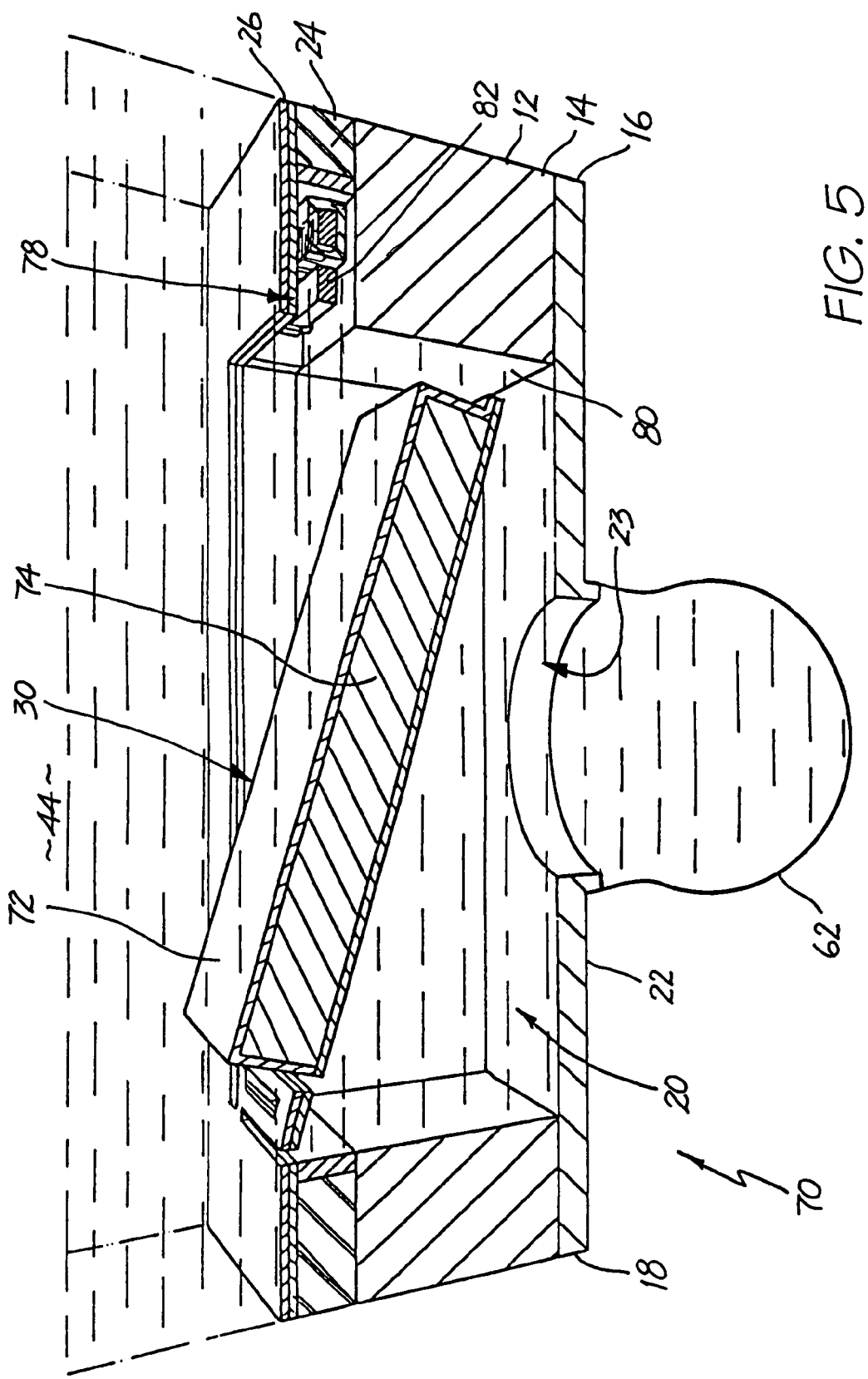
FIG. 5 shows a side sectioned view of a third embodiment of a printhead chip, in accordance with the invention, with a nozzle arrangement of the printhead in a pre-operative condition.
Figure 6:
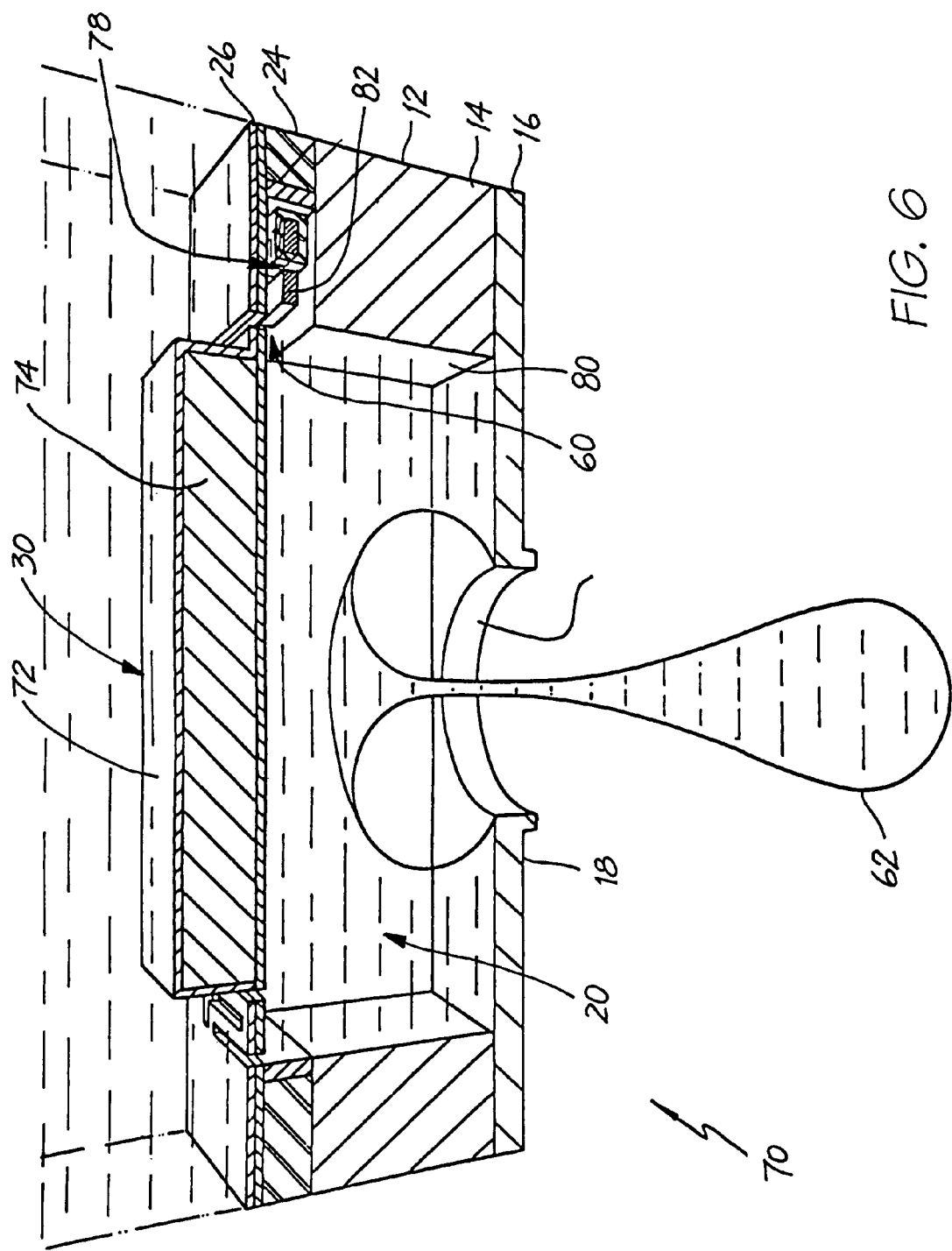
FIG. 6 shows a side sectioned view of the nozzle arrangement of FIG. 5, in a post-operative condition.

In FIGS. 5 and 6, reference numeral 70 generally indicates a nozzle arrangement of a third embodiment of a printhead chip, in accordance with the invention. With reference to FIGS. 1 to 4, like reference numerals refer to like parts, unless otherwise specified.

The nozzle arrangement 70 includes an actuator 72 which also acts directly on the ink 54 within the nozzle chamber 20. However, in this case, the actuator 72 is hingedly connected to the substrate 12 to be hingedly displaceable between the pre-operative position shown in FIG. 5 and the post-operative position shown in FIG. 6.

The actuator 72 has a magnetic core 74 which is susceptible to a magnetic field of cyclically reversing polarity applied to the printhead chip. The cyclically reversing magnetic field tends to cause the actuator 72 to oscillate between the positions shown in FIGS. 5 and 6. The magnetic core 74 is sufficiently sensitive and the magnetic field sufficiently strong so that this oscillation, if unchecked, results in the ejection of the drop 62 of the ink 54 from the ink ejection port 23.

The nozzle arrangement 70 includes a checking or obstruction mechanism 78 which is positioned in a side wall 80 of the nozzle chamber 20. The obstruction mechanism 78 is connected to the drive circuitry layer 24 to be controlled with a suitable control system (not shown) also connected to the drive circuitry. The obstruction mechanism 78 is configured so that, when activated, an obstruction member 82 of the mechanism 78 extends from the side wall 80 into the nozzle chamber 20. As can be seen in FIG. 5, this serves to obstruct movement of the actuator 72 into the nozzle chamber 20.

It will thus be appreciated that selective ejection of the ink 54 from the ink ejection port 23 can be achieved.

As with the previous embodiments, detail of the working and structure of the nozzle arrangement 70 is set out in the above referenced US applications. The primary purpose of illustrating these examples is to indicate possible configurations which can be achieved when the ink is displaced from the rear surface of the wafer substrate 14 to the front surface, through the wafer substrate 14.

Figure 7:
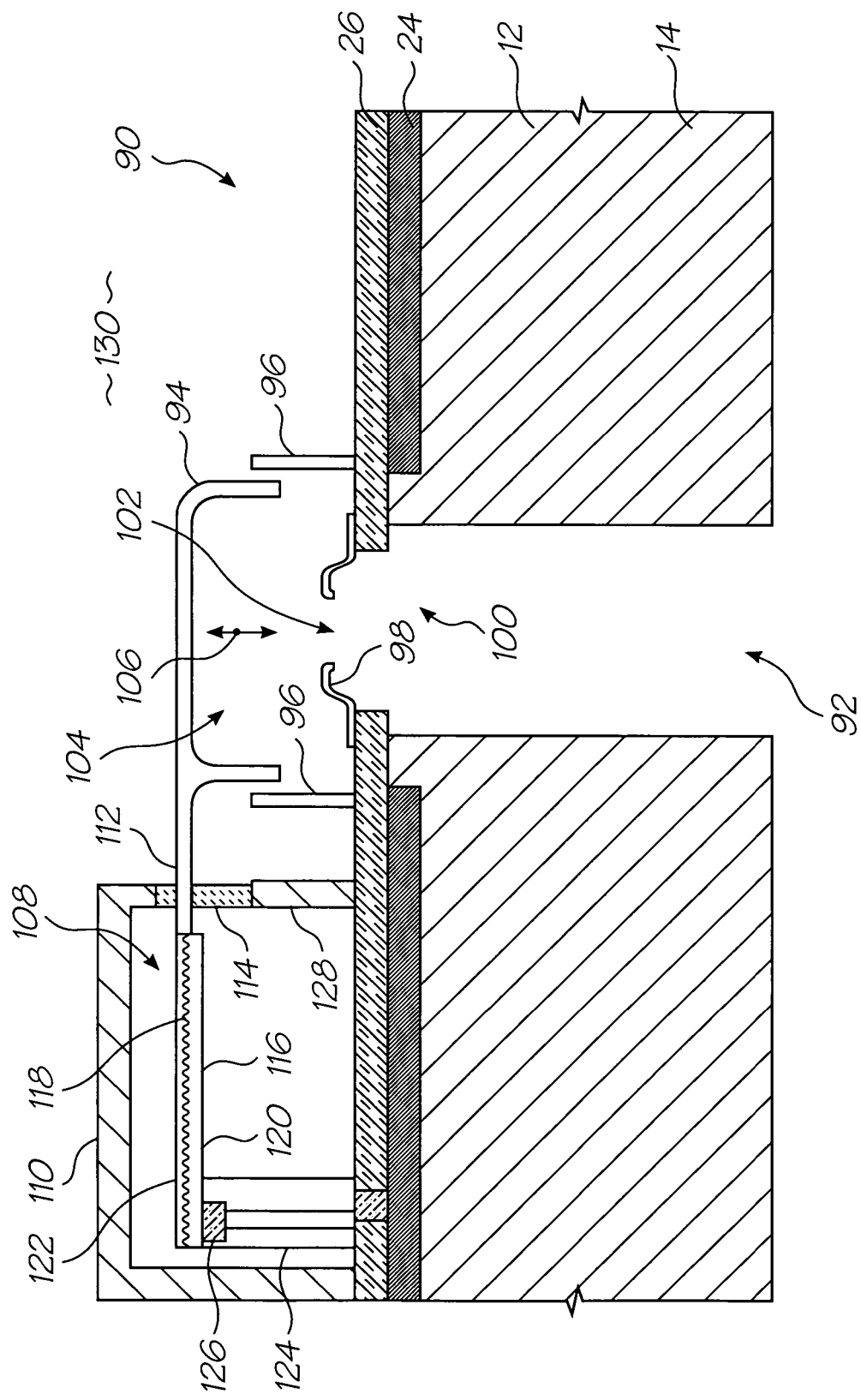
FIG. 7 shows a sectioned side view of a fourth embodiment of a printhead chip, in accordance with the invention.

In FIG. 7, reference numeral 90 generally indicates a nozzle arrangement of a fourth embodiment of a printhead chip, in accordance with the invention. With reference to FIGS. 1 to 6, like reference numerals refer to like parts, unless otherwise specified.

In the nozzle arrangement 90, the wafer substrate 14 is etched to define an ink ejection channel 92. Furthermore, the nozzle chamber 20 is defined by an ink ejection paddle 94 positioned behind the ink passivation layer 26, side walls 96 extending from the ink passivation layer 26 and a roof wall 98 spanning an inlet 100 to the ink ejection channel 92. Thus, the ink ejection paddle 94 defines a floor wall of the nozzle chamber 20. The roof wall 98 defines an ink ejection port 102. It follows that the ink ejection port 102 and the ink ejection channel 92 together define an ink passage through the wafer substrate 14.

The ink ejection paddle 94 is shaped to define an included volume 104 which forms part of the nozzle chamber 20. Furthermore, the ink ejection paddle 94 is partially received within the side walls 96. Thus, on displacement of the ink ejection paddle 94 towards the roof wall 98, a volume of the nozzle chamber 20 is reduced so that ink is ejected from the ink ejection port 102 to pass through the ink ejection channel 92 and on to the print medium. The direction of movement of the ink ejection paddle 94 is indicated by an arrow 106.

The ink ejection paddle 94 is connected to a thermal actuating device 108. In order to protect the device 108, a silicon nitride enclosure 110 is positioned on the passivation layer 26 to enclose the device 108.

The device 108 includes a deformable body 116 of expansion material having a coefficient of thermal expansion which is such that, upon heating, expansion of the material can be harnessed to perform work. The body has a proximal planar surface 120, closest to the wafer substrate 14, and an opposed distal planar surface 122. The device 108 includes a heater element 118 that is positioned in the body 116 to heat the body 116. As can be seen in FIG. 7, the heater element 118 is positioned closest to the distal surface 122. Thus, when the heater element 118 is activated, the expansion material in a region proximate the distal surface 122 expands to a greater extent than the remaining material. This results in the body 116 bending towards the substrate 14.

The body 116 is elongate, with one end attached to a support post 124 to provide a bending anchor. An opposed end of the body 116 is free to move. The heater element is connected to the drive circuitry layer 24 with a suitable via 126 in the support post 124.

An arm 112 interconnects the body 116 with the ink ejection paddle 94. In order to achieve this, the arm 112 extends through a fluidic seal 114 which is positioned in a wall 128 of the silicon nitride enclosure 110.

The enclosure 110, the ink ejection paddle 94 and the side walls 96 are all positioned in an ink reservoir, indicated at 130. The paddle 94 and the side walls 96 are positioned so that ink is permitted to flow into the nozzle chamber 20 from the ink reservoir 130, subsequent to displacement of the paddle 94 away from the ink ejection port 102.

A particular advantage of this configuration is that the ink is ejected from a point at the rear surface of the wafer substrate 14 to pass through the wafer substrate 14. As a result, special preparation of the front surface of the wafer substrate is not necessary. This simplifies the fabrication of the printhead chip with a resultant cost saving.

The invention claimed is:

1. An ink jet printhead chip which comprises
a wafer substrate;
a drive circuitry layer that is positioned on a first side of the wafer substrate, the wafer substrate and the drive circuitry layer defining a plurality of ink ejection channels that extend from the first side of the wafer substrate to a second, opposite, side of the wafer substrate;
a plurality of nozzle chamber structures positioned on said first side of the wafer substrate, each nozzle chamber structure defining a nozzle chamber containing ink in fluid communication with a respective ink ejection channel, each nozzle chamber structure comprising:
a roof wall positioned on a respective channel opening and defining an ink ejection port in fluid communication with the channel; and
a wall assembly that bounds the respective channel opening so that the nozzle chamber is defined by the wall assembly and the roof wall;
a plurality of ink ejection mechanisms operatively engaged with respective nozzle chamber structures and operable to eject the ink contained in the respective nozzle chambers from the respective ink ejection channels at the second side of the wafer substrate; and a plurality of micro-electromechanical actuators connected to the drive circuitry layer and connected to respective ink ejection mechanisms to operate the ink ejection mechanisms on receipt of an electrical signal from the drive circuitry layer.

2. An ink jet printhead chip as claimed in claim 1, in which each ink ejection mechanism includes an ink ejection member that partly defines the wall assembly of each nozzle chamber structure and is displaceable towards and away from the wafer substrate to reduce and enlarge a volume of the nozzle chamber so that ink is ejected from the ink ejection port.

3. An ink jet printhead chip as claimed in claim 2, in which each ink ejection member is an ink ejection paddle that defines a floor of the respective nozzle chamber, the ink ejection paddle being shaped further to define complementary side walls that cooperate with side walls that bound the respective channel opening, the floor and the side walls defining the wall assembly.

4. An ink jet printhead chip as claimed in claim 2, in which each actuator is a thermal actuating device that includes a deformable body of a material that is capable of thermal expansion to perform work and a heater element connected to the drive circuitry layer and arranged in the body so as to generate differential thermal expansion in the body and thus displacement of the body with respect to the wafer substrate.

5. An ink jet printhead chip as claimed in claim 4, in which the body is elongate with one end anchored to the substrate and an arm fast with an opposite end, the arm interconnecting said opposite end and the ink ejection member.

6. An ink jet printhead chip as claimed in claim 4, which includes a plurality of enclosures positioned on said one side of the wafer substrate, each thermal actuating device being positioned in a respective enclosure.

7. An ink jet printhead chip as claimed in claim 1, in which said one side of the wafer substrate is in fluid communication with an ink reservoir, such that the nozzle chamber structures are positioned in the ink reservoir.

* * * * *